United States Patent

[11] 3,566,773

[72] Inventor George A. Chadwick, Jr.
 Boyds, Md. (5100 Wisconsin Ave. N.W., Washington, D.C. 20016)
[21] Appl. No. 798,281
[22] Filed Feb. 11, 1969
[45] Patented Mar. 2, 1971

[54] BACON COOKING DEVICE
 6 Claims, 3 Drawing Figs.
[52] U.S. Cl.......................................... 99/349, 100/169
[51] Int. Cl.......................................... A47j 37/04
[50] Field of Search.................................. 99/349, 426, 443, 443 (C), 386; 107/57; 100/168, 169; 99/369, 372, 385, 433

[56] References Cited
UNITED STATES PATENTS

| | | | |
|---|---|---|---|
| 492,132 | 2/1893 | Bessonette | 100/169X |
| 809,415 | 1/1906 | Webb | 100/168X |
| 2,378,764 | 6/1945 | Frick | 100/169 |
| 3,052,559 | 9/1962 | Peebles | 99/443(C)X |
| 3,401,626 | 9/1968 | Amalfitano | 99/349X |

Primary Examiner—Walter A. Scheel
Assistant Examiner—Arthur O. Henderson
Attorney—Raphael Semmes ABSTRACT: A bacon cooking device consisting of two or more coacting metal rollers between the peripheries of which strips of bacon are fed. The rollers are heated by gas or electricity and are power driven so that the bacon is automatically cooked as it is fed between the rollers. The device includes means for applying a regulated, peripheral contact pressure between the heated rollers so as to facilitate cooking.

Patented March 2, 1971
3,566,773
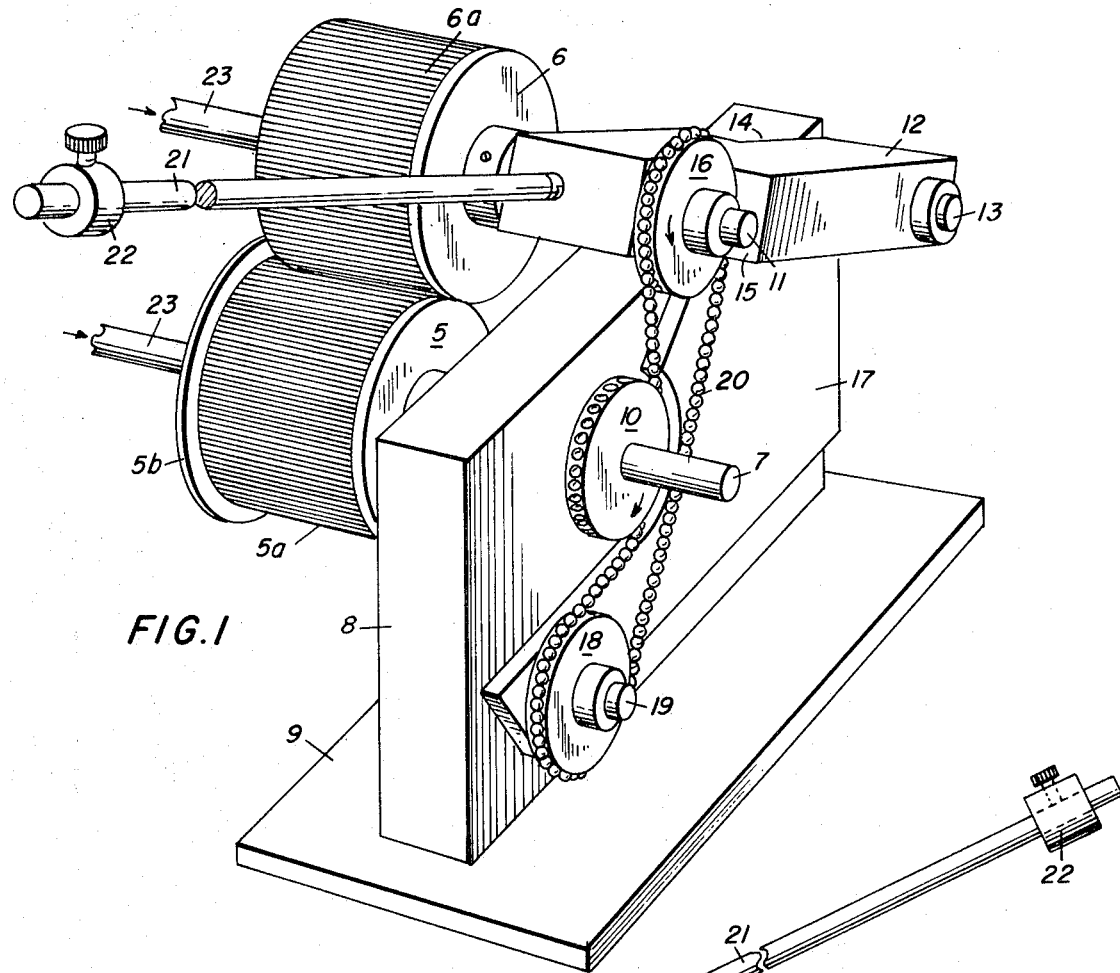
FIG.1
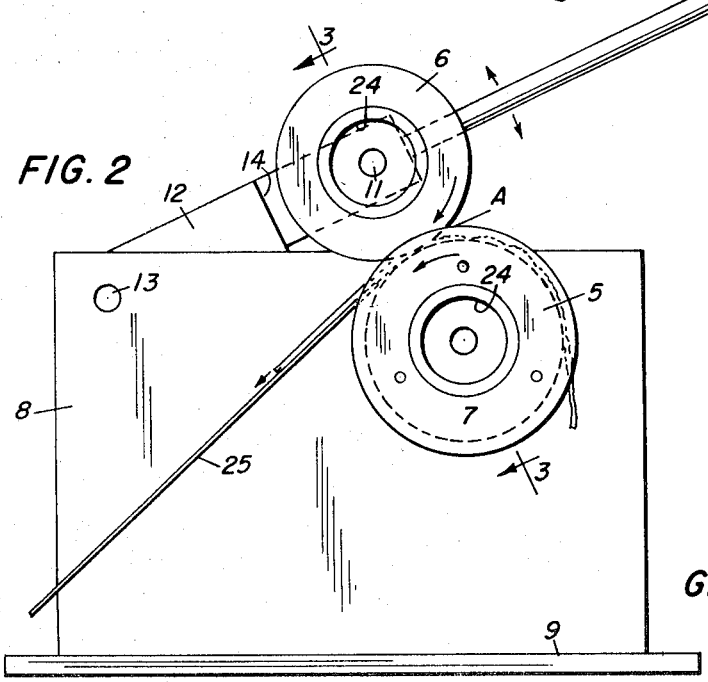
FIG.2
FIG.3
INVENTOR
GEORGE A. CHADWICK, JR.
BY Raphael Semmes
ATTORNEY

BACON COOKING DEVICE

BACKGROUND OF INVENTION

The cooking of bacon, particularly on a large scale basis, such as in hotels, restaurants, etc., is a time-consuming operation and one which requires constant supervision in order to produce bacon for the table having the desirable properties of texture and appearance. Also, considerable space is required in the use of skillets and grids such as conventionally used, and without constant attention, the bacon is either not sufficiently cooked or cooked to a greater degree than desired.

Furthermore, with conventional methods of cooking, the bacon frequently curls up, twists, or presents an otherwise unattractive appearance when served. In some instances, in order to avoid this, the cook places some cumbersome flat object on top of the bacon to press it down while cooking.

It is the primary object of the present invention to provide an automatic bacon cooker, wherein strips of bacon are simply fed between two or more heated rollers, coacting under regulated, peripheral pressure to control the degree of cooking, and, at the same time, to present more attractive cooked bacon strips.

Another object is to provide the peripheries of these coacting rollers with grooves which extend transversely of the direction of flow of the bacon so as to prevent slippage and control the advance of the bacon.

A further object of the invention is to provide a meat cooking device for bacon and other flat meat products wherein one heated roller is fixed and a second, floating, heated roller is arranged for peripheral contact with the fixed roller, and including means for applying a regulated, physical, lateral or radial pressure to the floating roller to control the peripheral tension between the coacting rollers.

With the above and other objects in view which will appear as the description proceeds, the invention consists in the novel features herein set forth, illustrated in the accompanying drawings, and more particularly pointed out in the appended claims.

THE DRAWINGS

Referring to the drawings in which numerals of like character designate similar parts throughout the several views:

FIG. 1 is a perspective view of the device;
FIG. 2 is a side elevational view; and
FIG. 3 is a sectional view taken on line 3–3 of FIG. 2.

DETAILED DESCRIPTION

In the drawings, referring first to FIG. 1, the device includes a pair of peripherally coacting rollers 5 and 6. The lower roller 5 is keyed to and rotates with a drive shaft 7 which extends through a vertical support plate 8 mounted on a base 9. Fixed to the drive shaft 7 is a drive pulley 10 which rotates with the lower roller 5.

The upper roller 6 is keyed to a driven shaft 11 which is rotatably supported in a pivoted block 12, one end of which is supported by the vertical support 8 through the medium of a pivot shaft 13. This block is cut away as at 14 to accommodate the adjacent end of the vertical support 8 when the block 12 is moved on its pivot.

The block 12 is also cut away as at 15 to accommodate a driven pulley 16 mounted on the driven shaft 11 and keyed thereto by any suitable means. Fixed to the block 12 and pivotally movable therewith is a plate 17 which is slidably disposed alongside of the vertical support 8. This plate carries at its lower end a driven pulley 18 which is freely rotatable on a stud 19 projecting from the plate. An endless chain 20 passes over the driven pulleys 16 and 18, and one run thereof passes under the drive pulley 10, as clearly shown in FIG. 1. There is sufficient slack in the chain 20 to accommodate the desired degree of movement of the pivoted block 12, the plate 17 and roller 6. With this arrangement, it will be seen that the rollers 5 and 6 are caused to rotate in opposite directions, and when the plate 17 is in its lowermost position on its pivot 13, with the roller 6 in direct contact with the roller 5, there is sufficient slack in the chain 20 to permit it to be slipped on or off of the drive roller 10 when desired. When strips of bacon are inserted between the rollers 5 and 6, the roller 6 automatically moves the required distance away from the roller 5, which movement is permitted by the pivoted block 12.

One end of the block 12 is provided with a projecting rod 21 which carries a longitudinally adjustable weight 22, so that the downward pressure on the roller 6 carried by the block 12 can be adjusted to augment the force of gravity and maintain the desired peripheral tension between rollers 5 and 6.

As previously stated, rollers 5 and 6 may be heated by any suitable means, that shown in the drawings comprising gas burners 23, fed from a source not shown, and fitting within central openings 24 which extend into the rollers a sufficient distance to insure adequate heating. Preferably, the rollers are composed of aluminum or a similar metal which is highly heat conductive, such as stainless steel.

As seen in FIG. 1, the peripheries of the rollers 5 and 6 are provided with grooves 5a and 6a, respectively, which run parallel with the axes of the rollers and transversely of the path of a strip of bacon passing therebetween. Thus, the strips of bacon, which are naturally greasy, are advanced between the rollers without the slippage which would otherwise occur. Also, the roller 5 is preferably provided with a guide and grease flange 5b which overlaps the end of the opposite roller and maintains the two in alignment. This flange which extends radially beyond the periphery of the roller 5 also tends to prevent the bacon from working out from between the rollers and directs grease flow away from the heat source, creating a point of drip to collection point directly below roller 5.

As seen in FIG. 2, on the discharge side of the rollers 5 and 6 a conveying plate 25 may be suitably fixed so that the upper end thereof engages the periphery of the drive roller 5 with a slight clearance and carries the cooked bacon away from the rollers as it is discharged from between their peripheries.

It is believed that the operation of this device will be obvious, but it may be briefly stated that as the rollers 5 and 6 rotate in opposite directions, as shown in FIG. 2, with the roller 5 rotating in counterclockwise direction and the roller 6 in clockwise direction, a strip of bacon is fed therebetween as at A. The driven roller 6, which is supported on the pivoted block 12, may be adjusted for peripheral pressure with roller 5 by moving the weight 22 longitudinally on the rod 21 until the desired surface pressure has been attained. With the tension adjusted, the bacon is fed between the rollers, as at A, under the influence of both heat and the application of pressure and cooked in a relatively flat strip, emerging from the opposite side of the rollers onto the conveyor 25. The application of both heat and physical pressure to the strips of bacon passing between the rollers greatly expedites the cooking operation over and above normal procedures and insures the production of cooked bacon which is relatively flat in form and devoid of the usual curls, twists and ripples.

While I have shown the invention as embodying two coacting rollers, it will be obvious that additional sets of rollers could be employed. The use of additional rollers would obviously speed up the cooking operation, as would also elongated rollers which would allow for several parallel strips of bacon to be cooked at once.

I claim:

1. A cooking device for strips of bacon or the like designed to avoid twisting and curling of said strips, comprising an axially fixed roller, a coacting roller having a free floating axis, arranged for peripheral contact with said fixed roller to receive therebetween a strip of bacon, said rollers being formed of a heat conducting metal and their peripheries having grooves extending longitudinally thereof substantially from end to end to prevent bacon slippage, means normally urging said floating roller into peripheral contact with said fixed roller, means for heating said rollers, and adjustable means for applying a regulated, physical, lateral pressure to said floating roller to control the peripheral tension between said coacting rollers.

2. A cooking device as claimed in claim 1, wherein said floating roller is mounted on a pivoted support to enable its bodily movement toward and away from the other roller.

3. A cooking device as claimed in claim 2, including weighted means for urging said pivoted roller toward said other roller.

4. A cooking device as claimed in claim 3, wherein said weighted means comprises a rod fixed to and extending from said pivoted support in a direction away from the periphery of the pivoted roller, and a weight which is longitudinally adjustable on said rod for determining the peripheral pressure of said roller against the opposite roller.

5. A cooking device as claimed in claim 1, including means on said fixed roller for directing grease away from the latter to a collection point below the same.

6. A cooking device as claimed in claim 5, wherein said last-named means comprises a radially extending flange which overlaps the end of said floating roller to maintain the two rollers in alignment.